(12) United States Patent
Schirholz et al.

(10) Patent No.: US 7,270,344 B2
(45) Date of Patent: Sep. 18, 2007

(54) AIRBAG MODULE

(75) Inventors: Mark Schirholz, Obertshausen (DE);
Samir Heric, Wiesbaden (DE)

(73) Assignee: Key Safety Systems, Inc., Sterling Hights, MI (US)

( * ) Notice: Subject to any disclaimer, the term of this patent is extended or adjusted under 35 U.S.C. 154(b) by 358 days.

(21) Appl. No.: 11/143,187

(22) Filed: Jun. 3, 2005

(65) Prior Publication Data
US 2006/0108775 A1 May 25, 2006

(30) Foreign Application Priority Data
Nov. 19, 2004 (DE) .................... 10 2004 056 010

(51) Int. Cl.
*B60R 21/16* (2006.01)
(52) U.S. Cl. .................. 280/728.2; 280/743.1
(58) Field of Classification Search ............ 280/728.2, 280/743.1, 732, 741
See application file for complete search history.

(56) References Cited

U.S. PATENT DOCUMENTS

| | | | |
|---|---|---|---|
| 5,421,607 A * | 6/1995 | Gordon | 280/728.2 |
| 5,498,023 A * | 3/1996 | Adams et al. | 280/728.2 |
| 5,570,899 A | 11/1996 | Matsuo | |
| 5,642,900 A | 7/1997 | Patel | |
| 5,857,696 A * | 1/1999 | Inoue et al. | 280/728.2 |
| 6,299,206 B1 * | 10/2001 | Keshavaraj | 280/743.1 |
| 6,585,292 B2 * | 7/2003 | Abe et al. | 280/743.1 |
| 2002/0067028 A1 * | 6/2002 | Ostermann et al. | 280/728.2 |
| 2004/0046365 A1 * | 3/2004 | Rose et al. | 280/728.2 |

FOREIGN PATENT DOCUMENTS

| | | |
|---|---|---|
| EP | 0744323 A1 | 11/1996 |
| WO | WO 99/67107 | 12/1999 |

* cited by examiner

*Primary Examiner*—Eric Culbreth
*Assistant Examiner*—Joseph Rocca
(74) *Attorney, Agent, or Firm*—Lonnie Drayer

(57) ABSTRACT

An airbag module, in particular for a frontal airbag, has a housing with at least one housing recess and a housing opening. The airbag has at least one opening therein for receiving an inflator. The inflator can be arranged in the housing opening and the opening in the airbag and the housing recess. The opening in the airbag for receiving an inflator is reinforced by a reinforcing member, which extends essentially around the opening in the airbag for receiving an inflator. The reinforcing member can be deformed and restored, to be guided from the interior of the housing through the housing opening, so that the reinforcing member at least partly is adjacent to the exterior wall of the housing in the region of the housing opening.

22 Claims, 4 Drawing Sheets

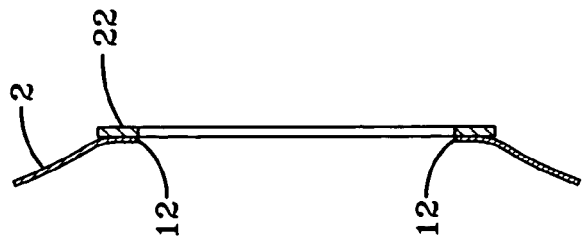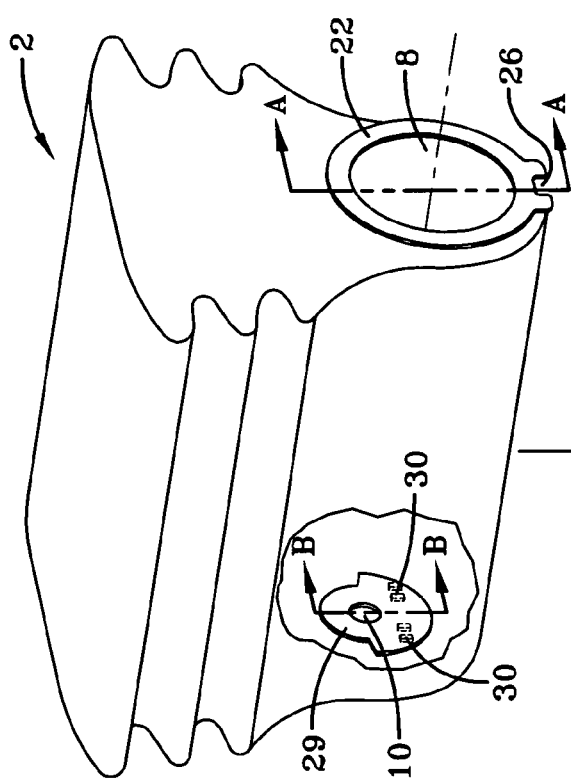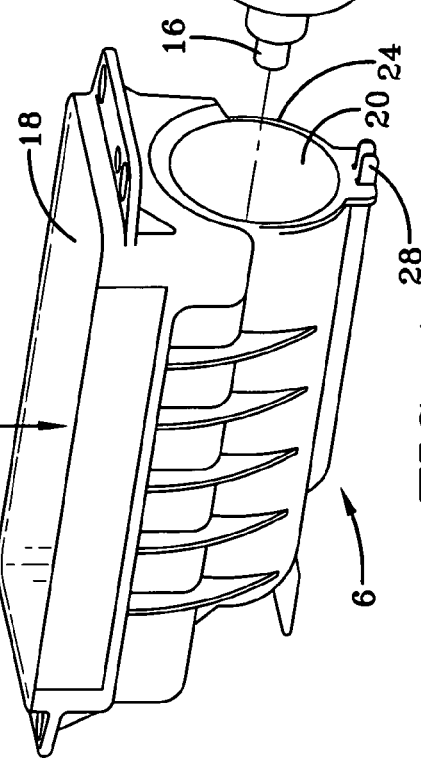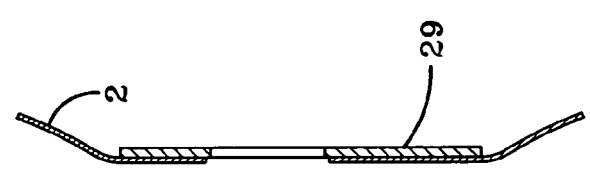

AIRBAG MODULE

FIELD OF THE INVENTION

The present invention relates to an airbag module, in particular for a frontal airbag.

DISCUSSION OF THE PRIOR ART

Airbag modules are located in front of a vehicle driver or passenger, for instance in a steering wheel or in an instrument panel. Since airbag modules represent a large cost in the manufacturing of a vehicle, it is desirable to manufacture these in a cost effective manner, by reducing their manufacturing time and complexity. EP 0 744 323 A1 teaches an airbag module that comprises an airbag in which a reinforcement ring is installed. The reinforcement ring defines an opening for receiving the inflator. The airbag module is assembled by the airbag being inserted together with the inflator from the outside into an opening of the airbag module housing, and retaining means in the form of a fastening link are crimped to the housing to secure the inflator together with the airbag to the housing. This airbag module, like previous ones, is expensive to manufacture.

SUMMARY OF THE INVENTION

According to the invention, an airbag module comprises a housing with a housing recess and a housing opening. An airbag has an opening in the airbag for receiving an inflator. An inflator is disposed in both the housing opening and the opening in the airbag for receiving an inflator. The opening in the airbag for receiving the inflator is reinforced by a reinforcing member, which extends essentially around the periphery of the opening in the airbag for receiving the inflator. The reinforcing member is elastic and can be deformed and restored to be guided from the interior of the housing recess through the housing opening, so that the reinforcing member at least partly becomes adjacent to an exterior wall of the housing in the region of the housing opening. The housing recess receives the airbag directly, i.e. the airbag is not inserted into the housing via the housing opening, but via the housing recess.

BRIEF DESCRIPTION OF THE DRAWINGS

FIG. 1 is an exploded view of a first embodiment of the airbag module according to the invention.

FIG. 1A is a sectional view along line A-A of FIG. 1.

FIG. 1B is a sectional view along line B-B of FIG. 1.

DETAILED DESCRIPTION OF THE INVENTION

Shown in FIGS. 1, 1A and 1B a first embodiment of an airbag module according to the invention comprises an airbag 2, an inflator 4 and a housing 6. The housing has a housing recess 18 used as an opening for the expansion of the airbag when the airbag is activated. This means that the airbag, in the non-activated state of the airbag module, is arranged in the housing and unfolds or protrudes out of the housing recess when deployed.

Figure 2:
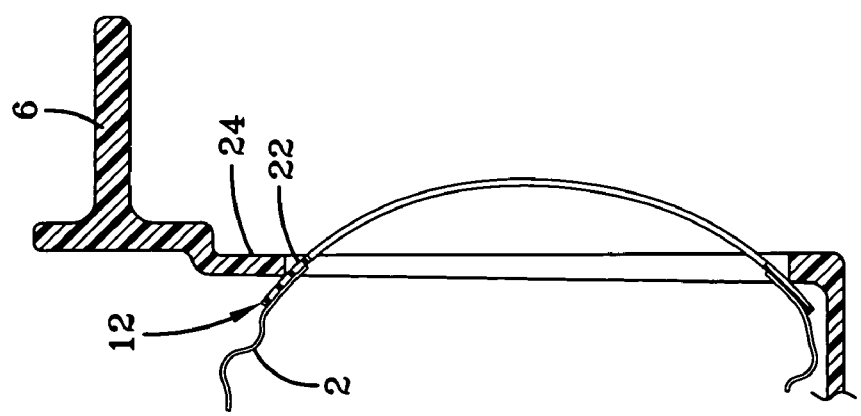
FIG. 2 is a partial sectional view of the airbag module according to FIG. 1.

The airbag 2 is preferably made of a textile material and has an opening 8 in the airbag for receiving the inflator 4 as well as an opening 10 in the airbag 2 for accommodating the fastening means 16 of the inflator 4. A circular reinforcing member 22 is located adjacent to the periphery 12 of the opening 8 in the airbag for receiving the inflator 8 and will be described in more detail with reference to FIGS. 2 and 3A. The reinforcing member 22 can be an integral part or in one piece with the airbag material, but it can also, as shown, be an additional ring shaped member, which is arranged from the outside, as shown in FIG. 1A, or from the inside on the airbag in the region of the opening 8 in the airbag for receiving the inflator. The reinforcing member 22 can be located on the inside of the airbag, but is preferably located on the outside of the airbag. In a further advantageous embodiment, the reinforcing member can also be arranged both on the inside and outside of the airbag.

An opening 10 in the airbag for accommodating the fastening means 16 of the inflator 4 is located essentially opposite the opening 8 in the airbag for receiving the inflator 4. The opening 10 in the airbag for accommodating the fastening means of the inflator can also be reinforced by a reinforcing member 29, which corresponds to the reinforcing member 22, as shown in FIG. 1B. The opening 8 in the airbag for receiving the inflator is complementary to the external configuration of the inflator 4 to ensure an essentially gas-tight module.

The elastic reinforcing member 22 has an external periphery that is larger than an internal periphery of the housing opening 20 and is configured such that the reinforcing member can be deformed and passed from the housing recess through the housing opening and then elastically return to a non-deformed state.

The housing opening 20 and the opening 8 in the airbag for receiving an inflator are ellipsoid, preferably essentially circular, and the reinforcing member is correspondingly annularly ellipsoid, preferably a reinforcing member. The housing opening and the opening in the airbag for receiving an inflator can also display any type of polygonal configuration. The housing opening and the opening in the airbag for receiving an inflator are preferably circular, and the diameter of the housing opening and the opening in the airbag for receiving an inflator corresponds essentially to the outer diameter of a cylindrical inflator.

In the present embodiment the inflator 4 is essentially cylindrical, so that the opening in the airbag for receiving an inflator 8 is also correspondingly circular. The inflator 4 has at least one projection 14 at a first end of the inflator. The projection 14 comprises in the present case a radially extending flange, but can also be in the form of one or several radially extending fastening links. A fastening means 16 is preferably located at the opposite end of the inflator 4. The fastening means 16 is extends through the opening 10 in the airbag for accommodating the fastening means of the inflator, to be brought into engagement with the housing 6, as shall be explained in more detail with reference to FIGS. 5A and 5B.

The housing 6 comprises a housing recess 18 and a housing opening 20. The housing recess 18 is receives the airbag 2. In other words, the airbag 2 is inserted from above into the housing recess 18. The housing opening 20 can have any appropriate configuration adapted to mate with the exterior of the inflator 4, which is preferably a cylinder. The housing opening 20 corresponds essentially to the external configuration of the inflator 4, since the inflator 4 is inserted from outside into the housing opening 20 and the opening in the airbag for receiving an inflator 8. Before the arrangement of the inflator 4 in the airbag/housing assembly, at least one part of the reinforcing member 22 is manipulated outwards through the housing opening 20, as will be explained with reference to FIGS. 2, 3A and 3B. The housing opening 20 is smaller that the housing recess, in particular approximately 50% and preferably approximately 20% of the cross section size of the housing recess, since the housing opening is used solely for receiving the inflator. Consequently, it is possible to guide the reinforcing member from inside out of the housing via the housing opening to the outside.

In further embodiments, the reinforcing member 22 is made of a synthetic material and sewn, glued and/or welded to the airbag in the region of the opening 8 in the airbag for receiving an inflator. The airbag and the reinforcing member or the reinforcing member can thus comprise at least two parts. It is possible to design the reinforcing member in the airbag as an integral part, for instance by foreseeing several layers of gas material or a corresponding sewing pattern used for stiffening purposes. In a multi-part arrangement of the reinforcing member, the latter can thus be sewn, glued and/or welded to the airbag. Further alternative fastening options are also feasible. The reinforcing member 22 can be connected to the airbag over its entire surface in the region of the opening in the airbag for receiving an inflator, but it is also possible to secure the airbag merely on its outer border region or distal border or on the inner border of the reinforcing member, if necessary at spot locations.

The reinforcing member 22 is elastic such that it can be deformed and restored. In other words, the reinforcing member 22 displays a characteristic feature that results in the reinforcing member regaining its original state after deformation and without the influence of external forces. The reinforcing member 22 consequently has the property of being dimensionally stable but flexible. The reinforcing member 22 can be an integral part of the airbag material, for instance a reinforced seam or a multi-layer arrangement of the airbag in the region of the periphery of the opening 8. In the shown embodiment, the reinforcing member 22 is formed of multiple parts and is secured to the airbag 2 in the region of the periphery 12 of the opening 8 in the airbag for receiving the inflator 4. The reinforcing member 22 is preferably made out of an elastic synthetic material, but it can also be made out of metal or a similar material. The external configuration of the reinforcing member 22 is at least in certain regions larger than the size of the opening 8 in the airbag for receiving an inflator, and overlaps the latter at least in certain regions, so that the reinforcing member 22 cannot be inserted through the housing opening 20 in its original state. After arranging the airbag 2 in the housing recess 18, the reinforcing member 22 is deformed from its original state or its original form into a shape in which it can be inserted through the opening 20 in the housing. As a result, in the airbag module according to the invention it is not necessary to guide the entire airbag 2 through the housing opening 20 from the outside into the housing, but rather merely to guide the reinforcing member 22 of the opening 8 in the airbag for receiving an inflator 8 from within the housing to the outside, so that the reinforcing member 22 can lie adjacent to the exterior wall 24 of the housing 6. This occurs after a complete insertion of the reinforcing member 22 through the housing opening 20 and a corresponding restoration of the reinforcing member 22 to its original state due to its elastic property.

The reinforcing member 22 is arranged between the exterior wall 24 of the housing and at least one projection 14 located on the inflator. The projection is a circular surrounding flange, so that the reinforcing member is arranged between the exterior wall of the housing and the flange of the inflator as a gasket. When the inflator is braced with the housing, it is thus possible to obtain a simple and cost effective sealing of the airbag.

Figure 3B:
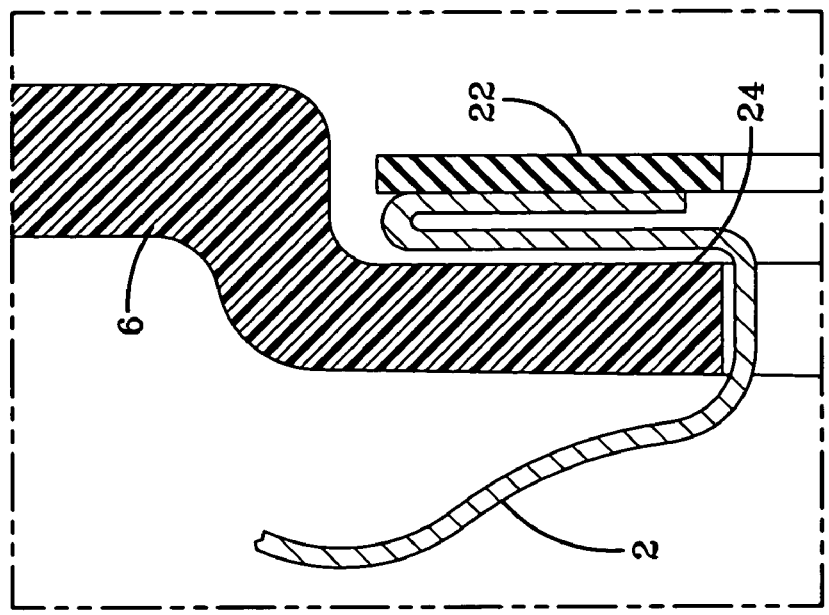
FIGS. 3A and 3B are a partly sectional view as well as an enlarged sectional view of the airbag module according to FIG. 1.
Figure 3A:
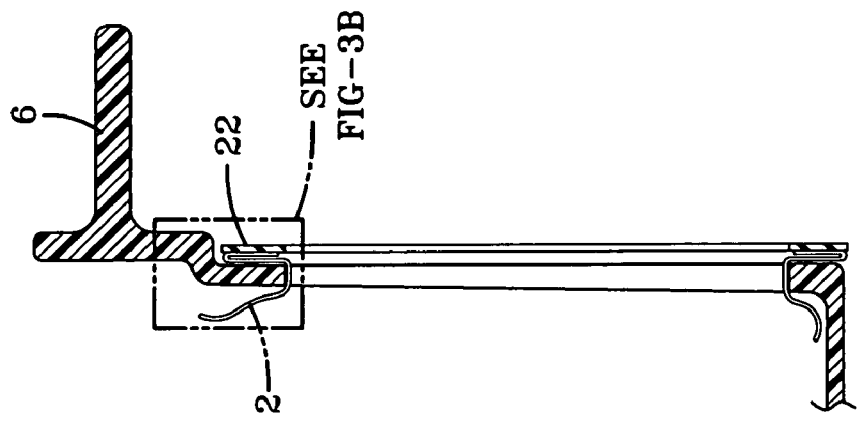

As shown in FIGS. 3A and 3B, the reinforcing member 22 is thus adjacent to the exterior wall 24 of the housing 6. Consequently, the inflator 4 can be inserted into the housing 6 or the airbag 2, without the airbag 2 folding up, since the latter is held in position by the arrangement of the reinforcing member 22 or the reinforcing member 22 on the exterior wall 24.

To improve the sealing of the module, a projection 14 can be located on the inflator 4, which presses the reinforcing member 22 against the exterior wall 24 of the housing 6, or else braces it there, as shown in FIG. 3B. The fastening means of the inflator 4 on the housing 6 required for this are described in more detail with reference to FIGS. 5A and 5B.

Figure 4:
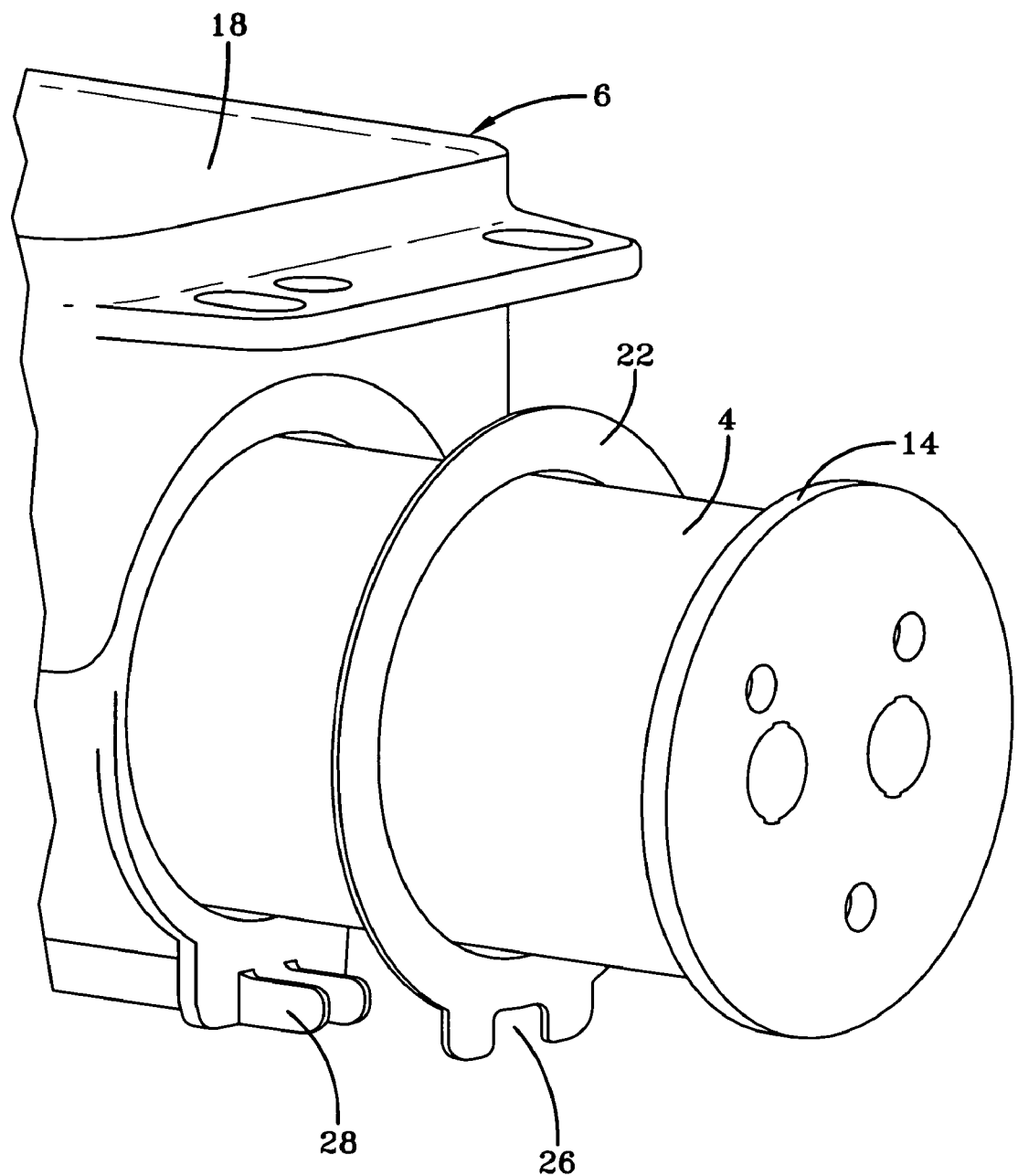
FIG. 4 is a partly perspective view of the airbag module according to the invention.

Referring especially to FIG. 4, to secure the location or positioning of the airbag 2, a positioning device can be located on the reinforcing member 22, designed preferably as an projection 26 in the reinforcing member 22, which can be brought into engagement with a corresponding projection 28 on the housing. Consequently it is possible to avoid rotation of the airbag 2 with reference to the housing 6 during the placement of the inflator 4. In addition, a control option is created, since after the assembly of the airbag module or in the case of an assembled airbag module, it can be visually recognised whether the airbag 2 is correctly arranged with reference to the housing 6, at least in the region close to the reinforcing member 22.

In a preferred embodiment, a positioning means 29, which can also function as a reinforcing means, can be located on the airbag 2 in the region of, or close to, the opening 10 in the airbag for accommodating the fastening 16 means of the inflator 4, designed so that they position the airbag 2 with reference to the housing at least in the region of or close to the an opening 10 in the airbag for accommodating the fastening means of the inflator. The positioning means 29 can comprise hooks 30 or similar locking means, which can be brought into engagement with the housing 6 or an inner wall thereof. In this manner it is ensured that the opening 10 in the airbag for accommodating the fastening means 16 of the inflator 4 is adjacent the fastening means 16 at least during the assembly of the module.

Figure 5A:
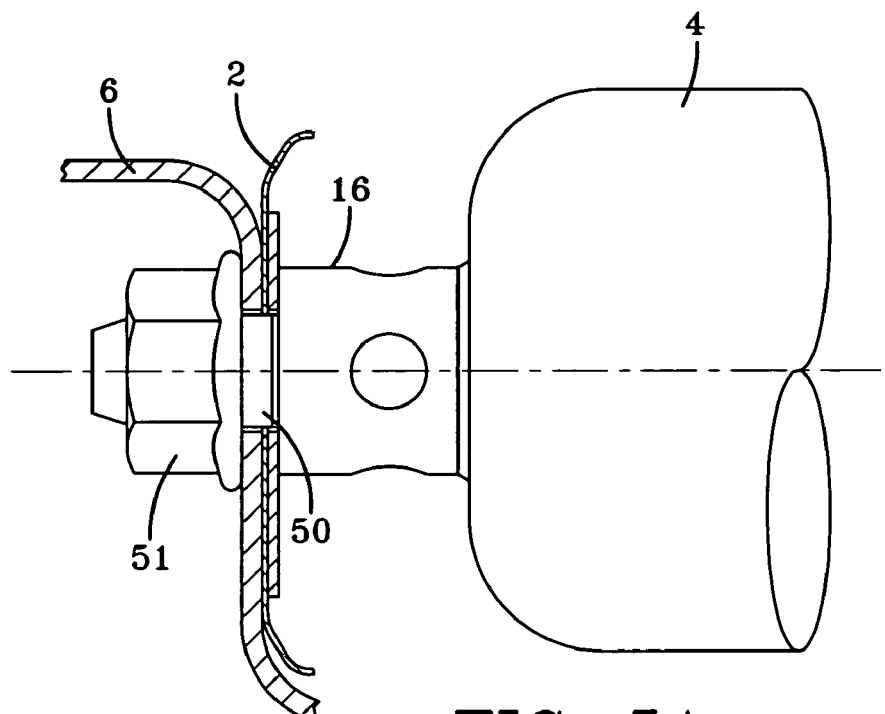
FIG. 5A is a top view of a part of the airbag module according to the invention in the first embodiment according to FIG. 1.
Figure 5B:
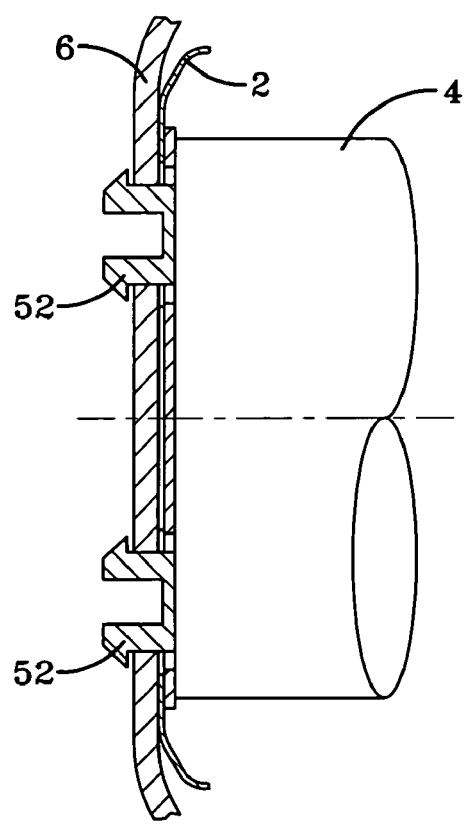
FIG. 5B shows a part top view of the airbag module according to the invention according to a second embodiment.

Two embodiments are shown in FIGS. 5A and 5B for the fastening of the inflator 4 to the housing 6. As shown in FIG. 5A, the fastening means 16 can be a counter-threading arrangement. The fastening means 16 comprises a shaft with a thread, which extends through the opening in the airbag for accommodating the fastening means and a corresponding opening 50 in the housing 6 and is secured in a threaded manner with a nut 51 outside of the housing. It is therefore possible to brace, on the one hand, the reinforcing member 22 between the projection 14 and the housing exterior wall 24 and, on the other hand, the airbag 2 in the region of the an opening 10 in the airbag for accommodating the fastening means 16 of the inflator 4 between the inflator and the housing interior so that the seal is improved.

A simplified embodiment of the fastening means 16 is shown in FIG. 5B. Instead of a threaded arrangement, one or several locking members 52 are located, which are arranged in corresponding openings in the housing 6 and thus engage the housing. Alternative fastening options, e.g. rivets or a clamp-like fastening means, are also obviously possible.

The individual parts can be assembled in a simple manner, whereby the airbag 2 is prevented from folding inwards or wrinkling during the insertion of the inflator 4. In addition, an airbag module is located, in which the inflator 4 essentially absorbs the forces of the released airbag 2, since the lower region of the airbag 2, as shown in FIG. 1, can support itself on the inflator 4.

A method of designing a frontal airbag module according to the present invention comprises the following steps: the arrangement of at least one part of an airbag in a housing recess of a housing; the deformation of a reinforcing member of an opening in the airbag for receiving an inflator which is capable of being restored and which extends essentially around the opening in the airbag for receiving an inflator; the guidance of the reinforcing member from the inside of the housing through a housing opening; the restoration of the reinforcing member to its essentially original form, so that the reinforcing member at least partly lies adjacent to the exterior wall of the housing essentially in the region of the housing opening; and the arrangement of an inflator in the airbag and the housing through insertion of the inflator in or through the opening in the airbag for receiving an inflator and the housing opening.

An airbag module which is easy to assemble is provided, since the airbag can be inserted into the housing via the housing recess, or can be arranged in the housing, and a reinforcing member can be guided through the housing opening, which correspondingly is adjacent to at least part of the exterior wall of the housing. It is possible to insert the inflator from the outside via the housing opening and the opening in the airbag for receiving an inflator into the airbag to hold the airbag is held in position, essentially at least in the region of the opening in the airbag for receiving an inflator, since it is adjacent to the exterior wall of the housing. The airbag is prevented from being reinserted into the inside of the housing during the insertion of the inflator. The inflator is used for receiving at least one part of the forces acting upon the airbag during airbag deployment, so that the reinforcing member remains essentially load-free during its release. This is possible due to a geometric arrangement, in which the region of the airbag located opposite the deployment direction or the housing recess can be supported on the inflator.

The present examples and embodiments are to be considered as illustrative and not restrictive and the invention is not to be limited to the details given herein, but may be modified within the scope and equivalence of the appended claims.

The invention claimed is:

1. An airbag module comprising:
   a housing with a housing recess and a housing opening;
   an inflator;
   an airbag located at least partly in the housing recess, the airbag having an opening therein for receiving the inflator, an elastic reinforcing member that is attached to or integral with the airbag and extends around the periphery of the opening in the airbag for receiving the inflator, the reinforcing member having an external periphery that is larger than an internal periphery of the housing opening and being configured such that the reinforcing member can be deformed and passed from the housing recess through the housing opening and then elastically return to a non-deformed state, the reinforcing member being located adjacent to an exterior wall of the housing such that the housing opening and the opening in the airbag for receiving the inflator are adjacent one another, the inflator being disposed within the housing opening and the opening in the airbag for receiving the inflator and inside a portion of the airbag that is located within the housing recess.

2. The airbag module according to claim 1, wherein the inflator has at least one projection located at a first end of the inflator and the reinforcing member is arranged between the exterior wall of the housing and the at least one projection located on the inflator.

3. The airbag module according to claim 1, wherein the housing opening, the reinforcing member and the opening in the airbag for receiving the inflator are essentially circular.

4. The airbag module according to claim 3, wherein the reinforcing member includes a device for positioning the reinforcing member relative to the housing by bringing the device into engagement with a mating feature of the housing.

5. The airbag module according to claim 3, wherein the reinforcing member is made of synthetic material and sewn, glued or welded to the airbag in the region of the opening in the airbag for receiving an inflator.

6. The airbag module according to claim 4, wherein the reinforcing member is made of synthetic material and sewn, glued or welded to the airbag in the region of the opening in the airbag for receiving an inflator.

7. The airbag module according to claim 1, wherein the airbag has at least one an opening therein for accommodating a fastening means of the inflator.

8. The airbag module according to claim 1, wherein the airbag has an opening therein for accommodating a fastening means of the inflator, the fastening means of the inflator extends through the opening in the airbag for accommodating the fastening means and a corresponding opening in the housing and is secured in place with regards to the housing.

9. The airbag module according to claim 8, wherein the fastening means comprises a locking device, a threaded fastening means or corresponding releasable or non-releasable fastening means.

10. The airbag module according to claim 1, wherein the airbag has an opening therein for accommodating a fastening means of the inflator, the fastening means comprising a threaded shaft that extends through the opening in the airbag for accommodating the fastening means and a corresponding opening in the housing and is secured in a threaded manner with a nut outside of the housing such that the inflator is secured in place with regards to the housing.

11. The airbag module according to claim 8, further comprising a positioning means located on the airbag in the region of the opening the airbag for accommodating the fastening means of the inflator, the positioning means securing the airbag with the housing at least in the region to the housing adjacent the opening the corresponding opening in the housing.

12. The airbag module according to claim 9, further comprising a positioning means located on the airbag in the region of the opening the airbag for accommodating the fastening means of the inflator, the positioning means securing the airbag with the housing at least in the region to the housing adjacent the opening the corresponding opening in the housing.

13. The airbag module according to claim 10, further comprising a positioning means located on the airbag in the region of the opening the airbag for accommodating the fastening means of the inflator, the positioning means securing the airbag with the housing at least in the region to the housing adjacent the opening the corresponding opening in the housing.

14. An airbag module comprising:
a housing with a housing recess and a housing opening;
an inflator having at one end thereof at least one projection and at an opposite end thereof a fastening means;
an airbag located at least partly in the housing recess, the airbag having an opening therein for receiving the inflator and an opening for accommodating the fastening means of the inflator, an elastic reinforcing member that is attached to or integral with the airbag and extends around the periphery of the opening in the airbag for receiving the inflator, the reinforcing member having an external periphery that is larger than an internal periphery of the housing opening and being configured such that the reinforcing member can be deformed and passed from the housing recess through the housing opening and then elastically return to a non-deformed state, the reinforcing member being located between an exterior wall of the housing and the at least one projection of the inflator such that the housing opening and the opening in the airbag for receiving the inflator are adjacent one another, the inflator being disposed within the housing opening and the opening in the airbag for receiving the inflator and inside a portion of the airbag that is located within the housing recess, the fastening means of the inflator extending through the opening in the airbag for accommodating the fastening means and a corresponding opening in the housing and is secured in place with regards to the housing.

15. The airbag module according to claim 14, wherein the fastening means comprises a threaded shaft that extends through the opening in the airbag for accommodating the fastening means and a corresponding opening in the housing and is secured in a threaded manner with a nut outside of the housing such that the inflator is secured in place with regards to the housing.

16. The airbag module according to claim 14, wherein the fastening means comprises a locking device, a threaded fastening means or corresponding releasable or non-releasable fastening means.

17. The airbag module according to claim 14, further comprising a positioning means located on the airbag in the region of the opening the airbag for accommodating the fastening means of the inflator, the positioning means securing the airbag with the housing at least in the region to the housing adjacent the opening the corresponding opening in the housing.

18. The airbag module according to claim 15, further comprising a positioning means located on the airbag in the region of the opening the airbag for accommodating the fastening means of the inflator, the positioning means securing the airbag with the housing at least in the region to the housing adjacent the opening the corresponding opening in the housing.

19. The airbag module according to claim 16, further comprising a positioning means located on the airbag in the region of the opening the airbag for accommodating the fastening means of the inflator, the positioning means securing the airbag with the housing at least in the region to the housing adjacent the opening the corresponding opening in the housing.

20. The airbag module according to claim 14, wherein the reinforcing member includes a device for positioning the reinforcing member relative to the housing by bringing the device into engagement with a mating feature of the housing.

21. The airbag module according to claim 15, wherein the reinforcing member includes a device for positioning the reinforcing member relative to the housing by bringing the device into engagement with a mating feature of the housing.

22. The airbag module according to claim 16, wherein the reinforcing member includes a device for positioning the reinforcing member relative to the housing by bringing the device into engagement with a mating feature of the housing.

* * * * *